3,010,737
TENSIONED COLLAR PROVIDING A LEAK PROOF SEAL

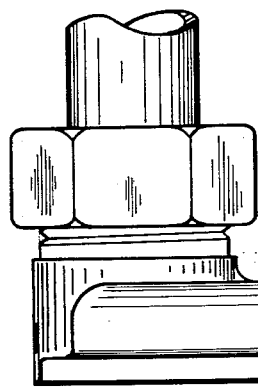
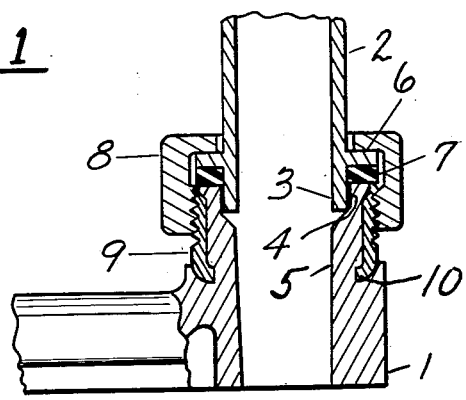
FIG. 1
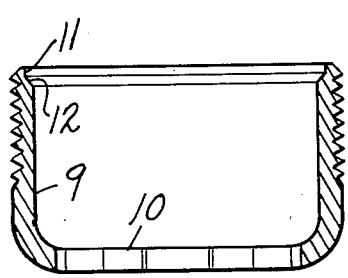
FIG. 2
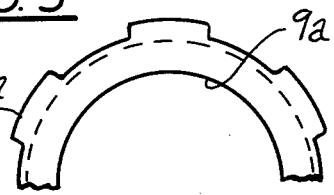
FIG. 5
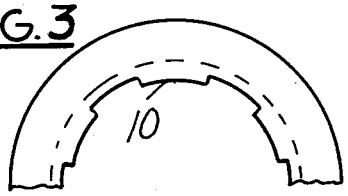
FIG. 3
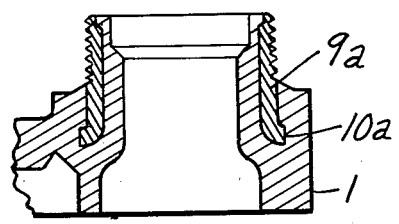
FIG. 6
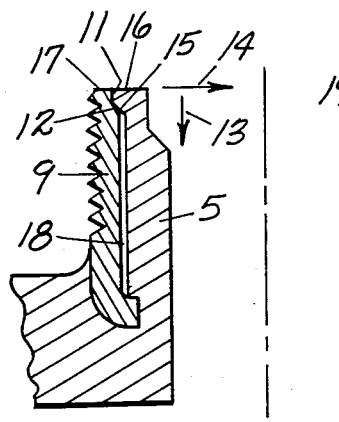
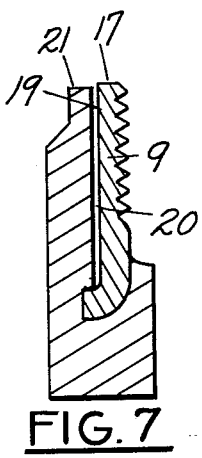
FIG. 7
FIG. 4
INVENTOR.
Archie C. Weingard
BY David C. Struble
Ralph Hammar
attorney

Archie E. Weingard, Jenkintown, and David C. Struble, Glenside, Pa., assignors to American Meter Company, Incorporated, Philadelphia, Pa., a corporation of Delaware
Filed Aug. 10, 1959, Ser. No. 832,656
3 Claims. (Cl. 285—173)

In gas meters, some part of the case, for example the cover, has a threaded fitting for the nut of a union in each of the incoming and outgoing gas lines so the meter can be readily removed for service or repair. When the case is aluminum, it is not satisfactory to form the threads for fitting on an integral section of the case because aluminum threads freeze or seize with the union nut after a period of time. While threaded steel fittings do not seize, it is difficult and costly to fix such fittings to an aluminum case.

This invention is intended to fasten threaded steel fittings to an aluminum casting in a mechanically strong and leak proof manner. Advantage is taken of the higher coefficient of expansion of aluminum as compared to steel to obtain the connection between the aluminum casting and the steel fittings.

In the accompanying drawing, FIG. 1 is an edge view partly broken away of the cover for an aluminum case meter, FIGS. 2 and 3 are respectively a vertical section and a bottom plan view of the steel fitting cast into the cover, FIG. 4 is an edge view partly broken away of another aluminum cover, FIGS. 5 and 6 are respectively a vertical section and a bottom plan of the threaded steel fitting cast into the FIG. 4 cover, and FIG. 7 is a diagrammatic view illustrating the manner in which the leak proof connection is obtained between the steel fitting and the aluminum casting.

In FIG. 1 is shown a die cast aluminum cover 1 for a gas meter having an inlet and an outlet each provided with a union comprising a nipple 2 with a reduced lower end 3 loosely received in a socket 4 in the upper end of a tubular aluminum stud 5 integral with the cover. The nipple has an outwardly extending flange 6 which is tightened against a gasket 7 on the upper end of the stud 5 by the usual swivel nut 8. It will be noted that the swivel nut 8 is screwed on an externally threaded steel sleeve 9 cast into the aluminum stud 5. Since the swivel nut 8 is of iron or steel construction, there is no danger of seizing or freezing of the threads.

The steel sleeve 9, as shown in greater detail in FIGS. 2 and 3, has at its lower end angularly spaced in-turned radially projecting tongues or teeth 10 which mechanically interlock the sleeve with the tubular aluminum stud 5 and prevent relative rotation between the sleeve and stud under torque applied through the swivel nut 8. At the upper end, the sleeve 9 has a counter bore 11 terminating in a downwardly and inwardly inclined shoulder or bevel surface 12. The purpose of the shoulder is illustrated in FIG. 7, a diagrammatic view which at the left illustrates the function of the shoulder in obtaining a leak proof joint during die casting and at the right illustrates what would happen if the counter bore were omitted. Because the coefficient of expansion of aluminum is greater than the coefficient of expansion for steel, during the cooling of the die casting, the aluminum stud 5 is subjected to forces tending to cause it to shrink both axially downward in the direction of the arrow 13 and radially inward in the direction of the arrow 14. As the aluminum stud tries to shrink axially in the direction of the arrow 13, the collar 15 at the upper end of the stud is forced downward into tight leak proof engagement with the bevel 12. This effectively prevents the shrinkage in the direction of the arrow 13 so that the sealing surface 16 at the upper end of the stud can be maintained flush with the surface 17 at the upper end of the sleeve. The shrinkage also makes a leak tight joint at the bevel 12 which seals any gap through which moisture might enter and cause corrosion. The radial shrinkage in the direction of the arrow 14 is not prevented, but the resultant gap 18 between the aluminum stud and the inner surface of the steel sleeve does no harm because it is closed at both ends. If the counter bore 11 and bevel 12 were omitted as shown at the right in FIG. 7, then as the die casting cooled the aluminum stud would shrink both axially downward and radially inward away from the smooth cylindrical inner surface 19 of the sleeve, providing the gap between the sleeve and the outside of the stud indicated at 20 and lowering the upper end 21 of the aluminum stud below the upper end 17 of the steel sleeve so that these two surfaces no longer would be flush as is desirable for proper functioning of the union.

In the modification of FIGS. 4, 5 and 6, the construction of the top is the same, the difference being in the threaded steel sleeve 9a which has radially outward extending tongues or teeth 10a at its lower end embedded in the aluminum. The tongues 10a have the same anchoring function as the tongues 10 of the insert 9. The tongues 10a also have the same function of placing the aluminum between the bevel 12 and the tongues under tension due to the greater thermal expansion of the aluminum. This results in the same kind of leak proof joint between the aluminum and the bevel 12 as in the FIGS. 1–3 construction. The difference in the FIGS. 4–6 construction is in the anchorage of the steel sleeve. All other features are the same and are indicated by corresponding reference numerals.

What is claimed as new is:

1. In an aluminum casting, a steel sleeve having the outer surface of its outer end exposed and the inner and outer surfaces of its inner end embedded in and covered by the casting, said sleeve having at its outer end a counter bore with an inwardly extending bevel and having at its inner end locking projections extending transverse to the bore of the sleeve and embedded in the casting, an integral tubular aluminum stud cast inside the sleeve and having its upper end an outwardly extending collar filling said counter bore, the greater coefficient of expansion of the aluminum stud causing the section of the aluminum stud between the bevel and said locking projections to be placed under tension pulling the collar tight against the bevel and providing a leak proof seal between the sleeve and stud.

2. In an aluminum casting, a steel sleeve having the outer surface of its outer end exposed and the inner and outer surfaces of its inner end embedded in and covered by the casting, said sleeve having at its outer end a counter bore with an inwardly extending shoulder and having at its inner end locking projections extending transverse to the bore of the sleeve and embedded in the casting, an integral tubular aluminum stud cast inside the sleeve and having its upper end an outwardly extending collar filling said counter bore, the greater coefficient of expansion of the aluminum stud causing the section of the aluminum stud between the shoulder and said locking projections to be placed under tension pulling the collar tight against the shoulder and providing a leak proof seal between the sleeve and stud.

3. The construction of claim 1 in which the locking projections comprise angularly spaced teeth in a radially projecting flange on said sleeve.

References Cited in the file of this patent
UNITED STATES PATENTS

| | | |
|---|---|---|
| 781,422 | Hayden | Jan. 31, 1905 |
| 1,290,613 | McDonough | Jan. 7, 1919 |
| 1,338,994 | Miller | May 4, 1920 |
| 1,676,976 | Angle et al. | July 10, 1928 |